United States Patent
Bodapati et al.

(10) Patent No.: US 8,838,549 B2
(45) Date of Patent: Sep. 16, 2014

(54) DETECTING DUPLICATE RECORDS

(76) Inventors: Chandra Bodapati, Saratoga, CA (US); Noel Vijay Gunasekar, Saratoga, CA (US)

(*) Notice: Subject to any disclaimer, the term of this patent is extended or adjusted under 35 U.S.C. 154(b) by 1197 days.

(21) Appl. No.: 12/168,727

(22) Filed: Jul. 7, 2008

(65) Prior Publication Data

US 2010/0005048 A1     Jan. 7, 2010

(51) Int. Cl.
   *G06F 7/00*      (2006.01)
   *G06F 17/00*     (2006.01)
   *G06F 17/30*     (2006.01)

(52) U.S. Cl.
   CPC ................. *G06F 17/30286* (2013.01)
   USPC ......................................... 707/692; 707/737

(58) Field of Classification Search
   None
   See application file for complete search history.

(56) References Cited

U.S. PATENT DOCUMENTS

| | | | |
|---|---|---|---|
| 5,666,553 A * | 9/1997 | Crozier ........................ 715/229 |
| 6,374,241 B1 * | 4/2002 | Lamburt et al. .................... 707/1 |
| 7,836,054 B2 * | 11/2010 | Kawai et al. ................... 707/737 |
| 7,840,610 B2 * | 11/2010 | Chandrasekharan et al. 707/809 |
| 2001/0054031 A1 * | 12/2001 | Lee et al. ....................... 705/406 |
| 2002/0013841 A1 * | 1/2002 | Schweitzer et al. .......... 709/224 |
| 2003/0078899 A1 * | 4/2003 | Shanahan .......................... 706/8 |
| 2005/0278292 A1 * | 12/2005 | Ohi et al. .......................... 707/1 |
| 2006/0106610 A1 * | 5/2006 | Napper .......................... 704/270 |

* cited by examiner

*Primary Examiner* — Mariela Reyes

(57) ABSTRACT

A method for finding duplicates by matching group of fields in records is disclosed. The method comprises standardizing data using field specific knowledge base; extracting at least part of one or more related fields of records; applying a matching attribute function to generate keys on the "comparable" field part extracted data; generating record level keys using generated field level keys; clustering the records based on generated record level keys; identifying reference record for each cluster identified; and calculating matching percentage for each record in a cluster with respect to reference record of the cluster. Devices and systems are disclosed that enable the method for finding duplicates.

18 Claims, 11 Drawing Sheets

| Record No. | Contact Name | Company | Phone |
|---|---|---|---|
| R1 | Robert Gales | eGrabber Inc | 408-1552 |
| R2 | Fredrick Samuel | ABC Corp | 406-6851 |
| R3 | Bob Gales | Egrabber Inc | 408-1552 |
| R4 | Jefferson Thomas | The Company Inc | 536-5512 |
| R5 | Jenifer Stenson | Great Banks | 457-9685 |
| R6 | Ferdrick Samuel | ABC corporation Limited | 406-6851 |

| Record No. | Contact Name | Name Key |
|---|---|---|
| R1 | Robert Gales | N1, N2 |
| R2 | Fredrick Samuel | N3, N4 |
| R3 | Bob Gales | N1, N2 |
| R4 | Jefferson Thomas | N5, N6 |
| R5 | Jenifer Stenson | N7, N8 |
| R6 | Ferdrick Samuel | N3, N4 |

FIG. 6E

| Record No. | Company | Company Key |
|---|---|---|
| R1 | eGrabber Inc | C1 |
| R2 | ABC Corp | C2 |
| R3 | Egrabber Inc | C1 |
| R4 | The Company Inc | C3 |
| R5 | Great Banks | C4, C5 |
| R6 | ABC corporation Limited | C2 |

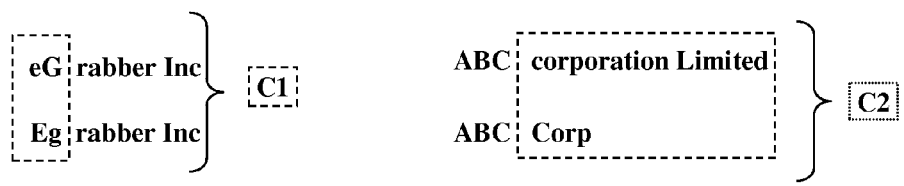

FIG. 6F

| Record No. | Contact Name | Company | Name- Company Key |
|---|---|---|---|
| R1 | Robert Gales | eGrabber Inc | Na, Ca |
| R2 | Fredrick Samuel | ABC Corp | Nb, Cb |
| R3 | Bob Gales | Egrabber Inc | Na, Ca |
| R4 | Jefferson Thomas | The Company Inc | Nc, Cc |
| R5 | Jenifer Stenson | Great Banks | Nd, Cd |
| R6 | Ferdrick Samuel | ABC corporation Limited | Nb, Cb |

FIG. 9

| Percentage Range | Quantized Value |
|---|---|
| 100 to >85 | 1.00 |
| <=85 to >55 | 0.25 |
| <=55 to >=0 | 0 |

DETECTING DUPLICATE RECORDS

BACKGROUND

1. Technical Field

The embodiments herein generally relate to data management, and, more particularly, to detection and removal of duplicate records.

2. Description of the Related Art

Database comprises of records, which are collection of values for multiple fields. Purchase database containing transaction details of customers would be a perfect example. Any such database accumulates duplicate records over a period of time due to various reasons ranging from error-prone data-entry to merging of multiple databases. There is unnecessary cost involved in maintaining and processing of duplicate records.

The brute force approach for de-duping is to compare each record with every other record in the database, which is computationally intensive. One of the ways to find duplicates with lesser computation is to generate checksums for records. These checksums are a sort of keys for each record, which might be formed by combining one or more fields. Then these keys are used for finding duplicates. For example a key could be formed from first four characters of the field "Last Name" and the first five characters of the field "Zip Code". Techniques like this helps in finding first level duplicates.

However, these techniques treat each field to be independent of each other, which is not true in most instances. Fields like state, zip and area code of phone field are dependent on each other. In many cases, user identification part of an email id is dependent on the name field of the record and the domain part of an email Id field might depend on the company field.

SUMMARY

In view of the foregoing, an embodiment herein provides a method of detecting and removing duplicate records, wherein each record comprises of data relating to a plurality of fields, the method comprising the steps of standardizing data using field specific knowledge base; extracting at least part of one or more related fields of records; applying a matching attribute function to generate keys on the "comparable" field part extracted data; generating record level keys using generated field level keys; clustering the records based on generated record level keys; identifying reference record for each cluster identified; and calculating matching percentage for each record in a cluster with respect to reference record of the cluster.

Another embodiment herein provides a system for detecting and removing duplicate records, wherein each record comprises of data relating to a plurality of fields, the system comprising at least one means adapted to pre-processing data to form clusters of records; and comparing records to calculate record level matching percentage.

In various embodiments the pre-processing unit may further comprises a knowledge base comprising of formats, mapping information and rules; a standardization unit to standardize data to represent information in similar formats; a field part pxtractor (FPE) to extract at least part of field information; a transformation unit to transform data, wherein the transformation unit transforms data by applying transformation functions, wherein the transformation functions make data comparable by filling information in fields based on available information using the knowledge base; and a key clustering unit, the key clustering unit further comprising a matching attribute generator, where the matching attribute generator generates field level keys based on at least one matching attribute function and further generates record level keys, and the key clustering unit clusters records based on record level keys.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 9 is a table according to an embodiment herein.

DETAILED DESCRIPTION OF PREFERRED EMBODIMENTS

Figure 1:
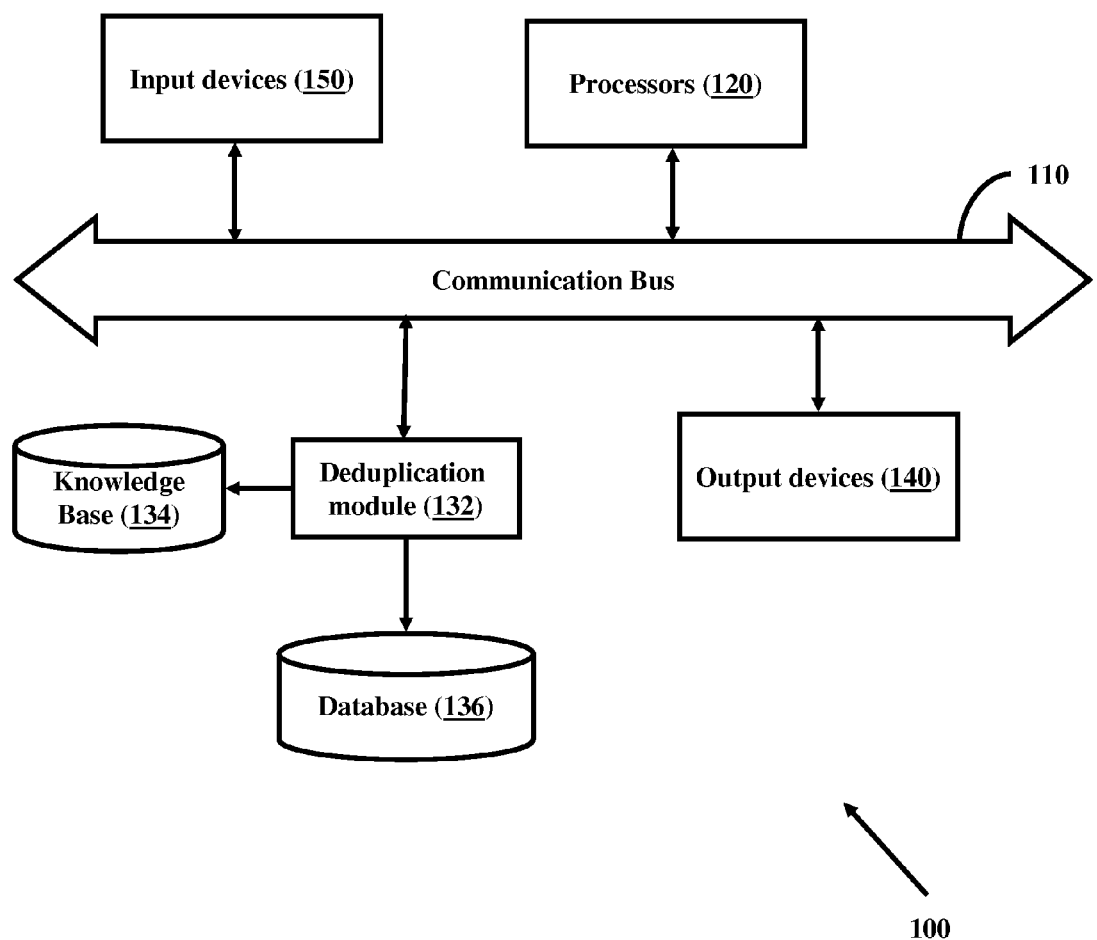
FIG. 1 illustrates an example computing environment in which the embodiments disclosed herein may be practiced.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve detection and removal of duplicates by providing a method for finding duplicates by matching group of fields in data records. The method involves application of appropriate matching functions to selectively match information across different fields within a group. Referring now to the drawings, and more particularly to FIGS. 1 through 9, where similar reference characters denote corresponding features consistently throughout the figures, there are shown preferred embodiments.

FIG. 1 is a block diagram of an example computing environment 100 according to various embodiments herein. The computing environment comprises of components including but not limited to a plurality of processors 120, input devices 150, output devices 140, a deduplication module 132, a knowledge base 134, and a database 136. Communication between the various components may happen through a communication bus 110. The database may include but is not limited to a relational database, object mapping database, xml data, persistent object data, flat file data, or any data structure or any data feed source suitable to be an input to the deduplication module 142. In various embodiments, the database may be accessible within a same computing environment or through a LAN network or through a WAN network or through the Internet. The deduplication module 132 is executed to eliminate the duplications of data in the database 136 according to various embodiments herein. The deduplication module makes use of the knowledge base 134 to normalize data before processing for deduplication. Normalizing data involves standardizing and transforming data such that data records are comparable. The knowledge base 136 comprises of necessary information and rules that allows the deduplication module 132 to normalize the data. FIG. 1 shows one embodiment wherein knowledge base 134 resides outside of the deduplication module 132. In some other embodiments, the knowledge base 134 may reside inside the deduplication module 132.

Figure 2:
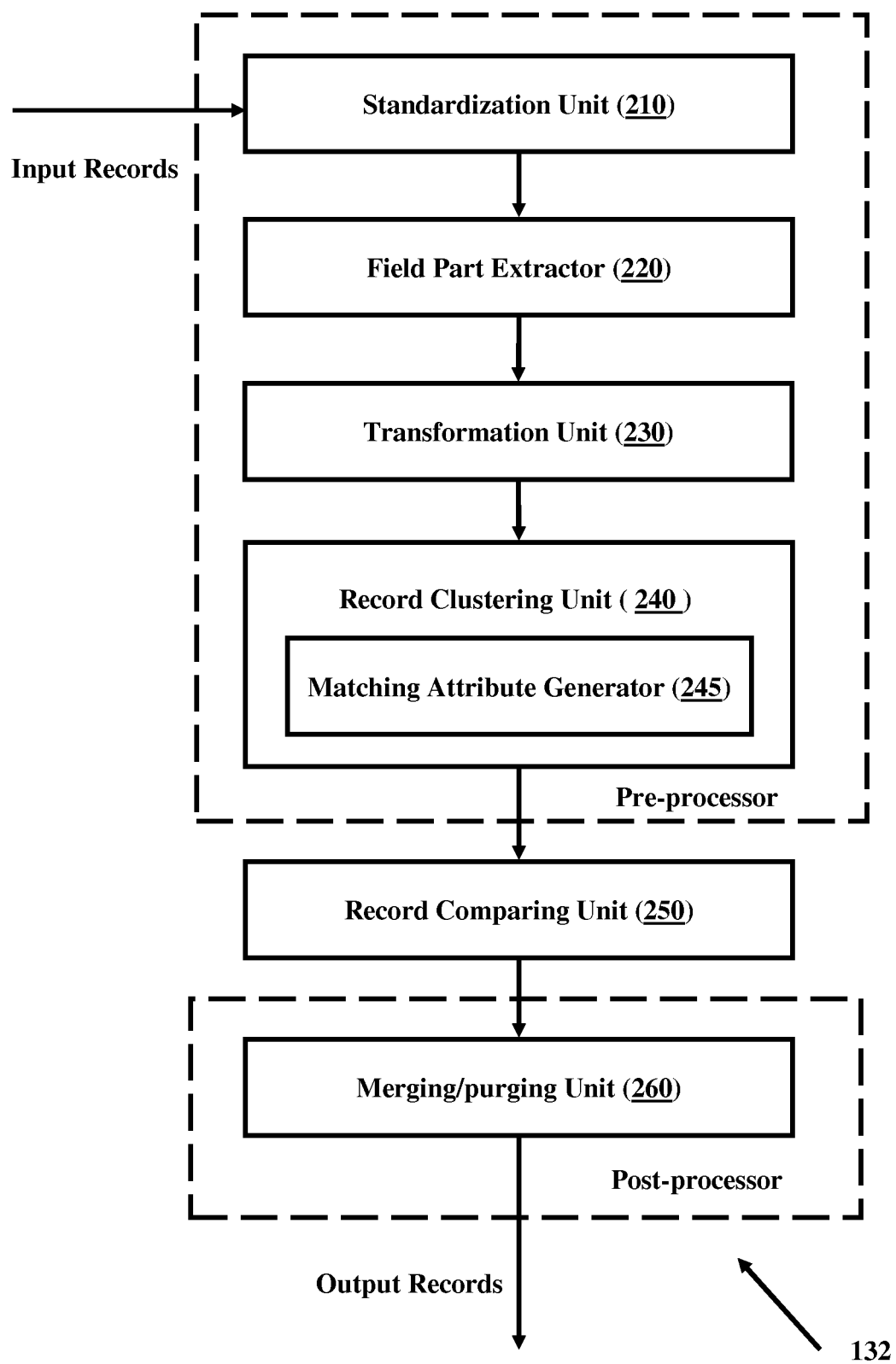
FIG. 2 illustrates the various blocks in the deduplication module according to an embodiment herein.

FIG. 2 is a block diagram of the deduplication module 132 comprising of at least a pre-processing unit, a record comparing unit 250 and a post-processor unit. In some embodiments, the pre-processing unit comprises of at least a Standardization unit 210, Field Part Extractor (FPE) 220, a Transformation unit 230, and a Record Clustering Unit 240 that further comprises of matching attribute generator 245. The post-processing unit comprises at least of a Records Merging/Purging Unit 260 to merge matching records with non-overlapping information and purge identical records that are no more useful. In other embodiments, the matching attribute generator 245 may reside outside the key clustering unit 240.

Figure 3:
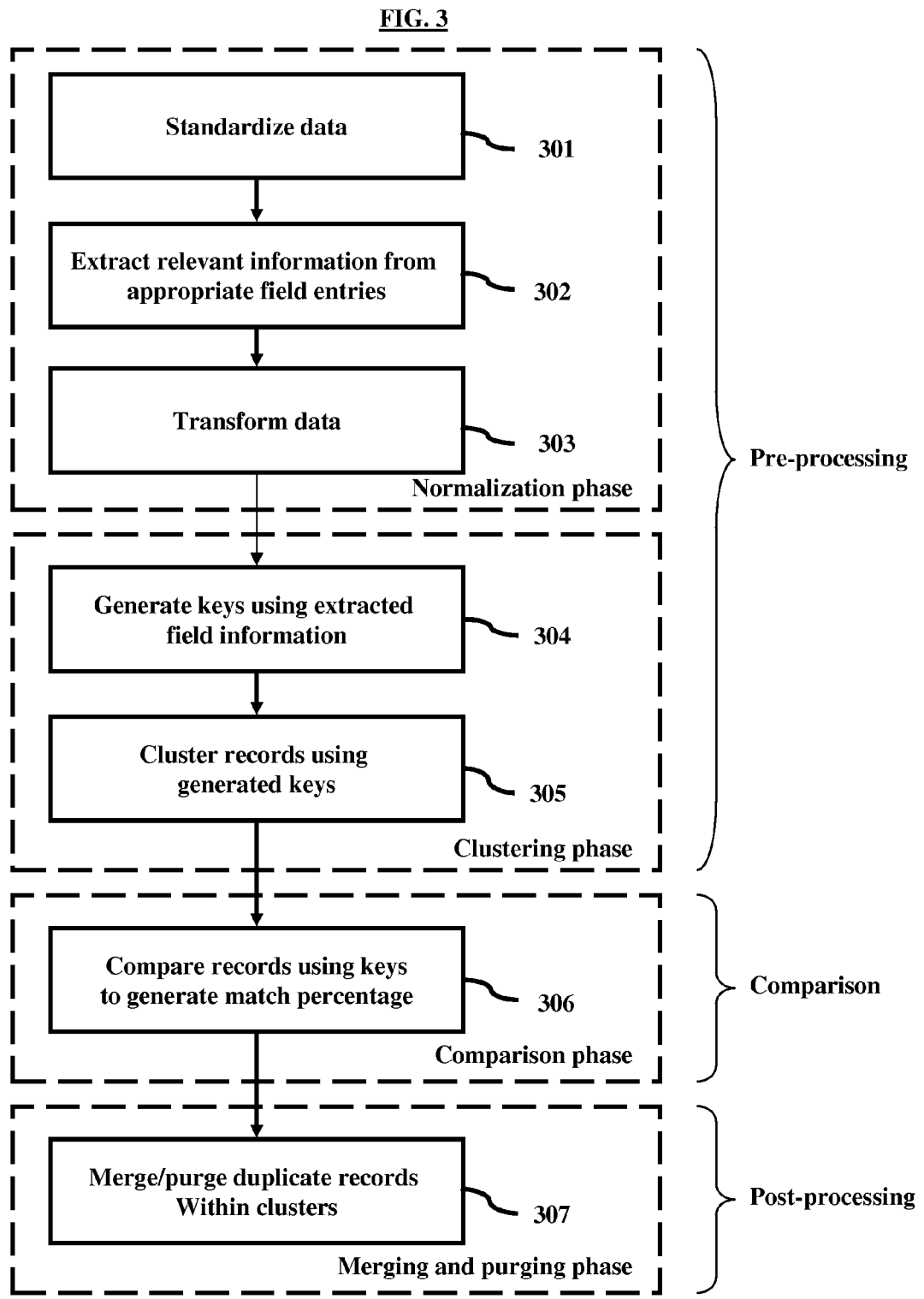
FIG. 3 is a flow diagram to illustrate the working of some of the components according to an embodiment herein.

FIG. 3 is a flow diagram to illustrate a non-limiting implementation of the deduplication module according to an embodiment herein. Input records from the database 136 are standardized (301) using the standardization unit 210 so that data is standardized in the way it data is represented. Standardization involves ensuring the information in various fields is represented in a standard format so that comparison is easy. For example, to standardize a name field having information "Fredson MD, Dr. Kevin" to the format [FName, LName]=[Kevin, Fredson] (where FName represents First Name and LName represents LName) requires field specific pattern rules where the pattern is "<last name><degree>, <salutation><first name><middle name>". The FPE 220 extracts (302) relevant information from appropriate field entries. The transformation unit 230 transforms the input data (303) records using from extracted field information. Transformation involves ensuring the records have information in comparable fields. For example, it is possible that while comparing two records A and B, record A has phone information and record B does not contain the phone information but contains city and state information. For the two records A and B to be comparable, it would be easy to have information filled in corresponding fields so that comparison between records would be easier. The transformation unit 230 uses knowledge base 134 to fill in missing information using available information. So, continuing the example of records A and B, the transformation unit 230 may fill in city and state information in record A using the phone code information. The transformation unit 230 uses the extracted phone code information from record A in order to achieve that.

The clustering Unit 240 comprising of the matching attribute generator 245 generates keys (304) as described hereafter for tokens, fields and records and clusters (305) similar records based on keys assigned. The Comparing Unit 230 compares the similar records using match percentage (306) as described hereafter. The Merging/purging Unit 260 merges the duplicate records based on match percentage (307).

The knowledge base 134 comprises of information in terms of format, data, and rules to assist in the process of transformation and standardization (combination being referred to as normalization). As an example, the knowledge base 134 may include information on various salutations and degrees that are normally attached to names so that such information can be recognized while processing name fields.

Figure 4:
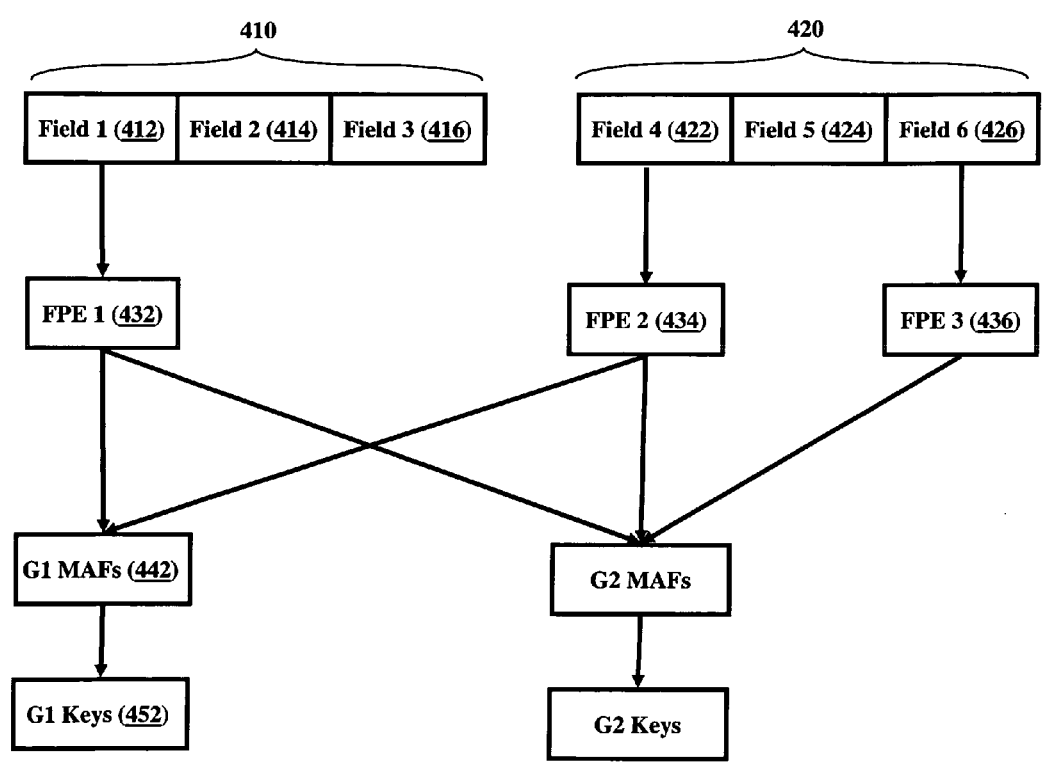
FIG. 4 illustrates the mechanism of generating keys by clustering according to an embodiment herein.

FIG. 4 illustrates the pre-processing according to an embodiment for extracting relevant field entries, generating keys and clustering records based on generated keys. The FPE 220 extracts portions of the fields comprising of field entries (412, 414, 416, 422, 424, 426) in records wherein the entry can comprise a combination of a single or plurality of field entries without substantive modifications and combined to other parts of the entries which may be irrelevant for the determination of duplication. The field parts extracted are based on the clustering criteria being used. The extracted field parts are then input to the matching attribute generator to generated keys. The matching attribute generator may utilize a suitable matching attribute function to generate keys. The extracted field entries FPE 1, 432 from record 410 and FPE 2, 434 from record 420 are provided as input to G1MAF, 442 wherein "G1MAF" denotes the matching attribute function for group G1 that comprises of the field entries of plurality of fields which can be used to match the extracted entry wherein the function for comparison of the fields may be as follows:

F1.Whole.StringCompare (F4.Whole)

The Record Clustering Unit 240 clusters the key generated by the MAF 245 as illustrated by G1 Keys 452 in FIG. 4. The Clustering Unit 240 comprising of the Matching Attribute generator 245 clusters similar records based on the keys generated by executing relevant matching attribute functions (MAF) to identify the duplicate records. The Matching Attribute Function (MAF) used by the generator includes but is not limited to n-Gram MAF, Spell MAF, Sound MAF, Abbreviation MAF and Alias MAF.

The choice of a Matching Attribute Function can be based on attaining balance between increasing the number of "true" duplicate clusters formed while keeping the number of comparisons under limit. A "broader" MAF would result in good accuracy as all records would get grouped as clusters but would increase the number of comparisons. A "narrower" MAF would result in lesser number of comparisons but bad duplicate-find accuracy.

N-Gram Matching Attribute Function:

N-Gram MAF generates same key for tokens having the same starting N-gram. Example "Jonathan" and "Jonah" would get the same Key for N=4 as both the tokens have the same starting 4-gram "Jona". There is an extension of N-Gram MAF called as Variant N-Gram MAF. This forms key based on the first N consonants in the token. This is "narrower" MAF when compared to plain N gram MAF.

Spell Matching Attribute Function:

Four-Gram MAF though catches variations; it generates different keys for tokens having spelling variation in the first N characters. Example "John" and "Jogn" would get different keys based on Four-Gram MAF. This is taken care by the Spell MAF. The Spell MAF generates n−1 gram combinations of tokens so that tokens with exactly one spelling error are grouped together. So for "John" Spell MAF generates— "ohn","jhn","jon","joh" keys and for "Jogn" it generates—

"ogn", "jgn","jon","jog". Here both the tokens have one common key that is "Jon" based on this key they would be hashed together.

Keys generated for "Fredrick Samuel" are (red,amu), (red, smu), (red,sau), (red,sam), (fed,amu), (fed,smu), (fed,sau), (fed,sam), (frd,amu), (frd,smu), (frd,sau), (frd,sam), (fre, amu), (fre,smu), (fre,sau), (fre,sam).

Keys generated for "Ferdrick Samuel" are (erd,amu), (erd, smu), (erd,sau), (erd,sam), (frd,amu), (frd,smu), (frd,sau), (frd,sam), (fed,amu), (fed,smu), (fed,sau), (fed,sam), (fer, amu), (fer,smu), (fer,sau), (fer,sam).

For a match there should be at least one key that is matching between both the items. Since Keys (fed,amu), (fed,smu), (fed,sau), (fed,sam), (frd,amu), (frd,smu), (frd,sau), (frd,sam) match, these values would be hashed to the same key.

The advantage of this approach is the key is generated without any comparison. The disadvantage is that this solution becomes practically infeasible as the number of tokens increases. To narrow this MAF, one can make an assumption that the probability of getting spelling error in two words at the same time is less. Hence one could generate only 8 combinations instead of the 16 combinations.

Sound/Phonetic Matching Attribute Function

Sound MAF generates same key for similar sounding tokens. Example "chris" and "kris" gets the same key and hence grouped together. There are many phonetic algorithms developed that could be used for this purpose. Russell Soundex Algorithm, New York State Identification and Intelligence System (NYSIIS), Metaphone, Double Metaphone, are used in our MAF for generating the phonetic keys for tokens. Using many algorithms ensures reduction in the overall error percentage.

Abbreviation Matching Attribute Function:

Abbreviation MAF generates same key for abbreviations and actual tokens. Example "International Business Machine" and "IBM" get the same key and hence hashed together. There are certain extensions that are done to take care of complex abbreviations. Example "NY Times", "New York Times", "NewYork Times" and "NYT" should get the same key.

Alias Matching Attribute Function:

Alias MAF ensures alias tokens get the same key. Alias MAF is applicable across all fields. In name field it could be nicknames e.g., Robert and Bob, Elizabeth, Beth and liza, William and Bill could be present in different fields. In company field it could be merger/equivalent names e.g., Hewlett-Packard and Compaq, Bell labs and Lucent technologies. Alias MAF is a configurable function and has the flexibility of customization.

The described method first groups similar records at field level, and then correlates different groups to cluster them at the record-level. The record level clusters consist of exact, close and probable matching records. In order to keep the computation less intensive and reduce the time-space complexities, it is important to ensure the size of the groups at the field-level. The size of the groups is dependent on the MAF criteria. By selectively choosing MAF or by altering the internal algorithms in the MAF group size can be controlled.

In an embodiment, the "narrowness" of MAF is dynamically increased as the number of records in the database increases. This is achieved by using changing matching attribute functions dynamically. In other embodiments, the dynamic changing of "narrowness" may be achieved by changing the underlying algorithms for a particular matching attribute function.

For example, the Sound Based MAF may include but is not limited to Soundex, NYSIIS and Metaphones algorithms.

Before field-level grouping, the nature of the database (for example, number of records) is studied. Based on the number of records in the database, one can select, for instance, only NYSIIS for the name, as NYSIIS is proven to be good for name-field, for the Sound Based MAF. This effectively limits the size of the group and therefore the "narrowness" of MAF. The other parameters based on which algorithms may be dynamically changed include data entry method. For example, data may be entered through manual entry, through an import service with specific formats, through voice input, web forms, optical character recognition and so on. Each input type may have a specific algorithm that is more effective for that particular type of input.

Using these Matching Attribute Functions the clustering phase groups the "probable" duplicates. The clusters are then used as input for comparison.

Transformation and Standardization

TABLE 1

| Record No. | Name | Phone | City | State |
|---|---|---|---|---|
| R-04 | Bob Thomson | 716-123-1234 | Buffalo | New York |
| R-05 | Thomson, Bob | (716) 123-1234 | Buffalo | New York |

Data may be standardized for presentation so that data is more comparable in its format. For example, as shown in Table 1, it is possible that same data is represented in different formats. One such example is presented through the name field, where a name field could be written in "<FName><LName>" format or "<LName>, <FName>". Also, second such example presented in Table 1 is relating to the phone number. Phone can be written in either "(area code) (number)" or "(area code)-(number)". Using the same phone number as in Table 1, it is also possible to write the phone number in many other ways including 17161231234 and so on. The knowledge base captures formats and rules that assists in matching data into different formats and subsequently convert all data into a single format using the standardization unit 210.

Upon standardization and field extraction, to make the records comparable appropriate transformation functions are used. Transformation function involves usage of knowledge base rules and formats to convert the data such that corresponding information is available in records for comparison.

TABLE 2

| Record No. | First Name | Last Name | Company | Email ID |
|---|---|---|---|---|
| R-07 | Jefferson | Clifford | Creative Inc | |
| R-02 | | | | jclifford@creative.com |

For example in Table 2, if record R-07 and R-02 have to be compared, name part has to be compared with the username part of the email, since corresponding field data is missing the two records. They are not directly comparable with the N-Gram approach as illustrated as representation of names and emails are different. In this example the email pattern of email id found in record R-02 is formed by concatenating the first letter of FName (first name) with the LName (last name) of record R-07. In some embodiments, transformation functions are applied on name field to generate email patterns. The knowledge base contains various rules for email pattern to generate email ids from name field. The email patterns captured by knowledge base may include but not limited to <FName>.<LName>, <First letter of FName><LName>, <FName><First letter of LName>, <FName>.<First letter of LName> and so on.

TABLE 3

| Record No. | Name | Phone | City | State |
|---|---|---|---|---|
| R-09 | Jefferson Clifford | 716-123-1234 | | |
| R-06 | J C | | Buffalo | New York |

In another example shown in Table 3, comparing the records requires comparing phone field with the city and state field. To make them comparable, area-code of the phone number needs to be transformed to city and state using phone knowledge base and then compare them. Transformation function involves converting data in one field into equivalent data in another field so that records can be compared. Knowledge base captures information about the phone codes and their corresponding city, state and zip code information. In the example of Table 3, in accordance to some embodiments, since the phone code is known for R-09, the city and state columns can be filled using the information available in the knowledge base by an appropriate transformation function. In various embodiments, knowledge base also captures information relating to various units of measurements and their conversion ratio. For example, information relating to conversion between different units can be captured. Such information may include but is not limited to conversion ratio from and between miles and kilometers, or dollar and euro and so on.

Clustering

Figure 5:
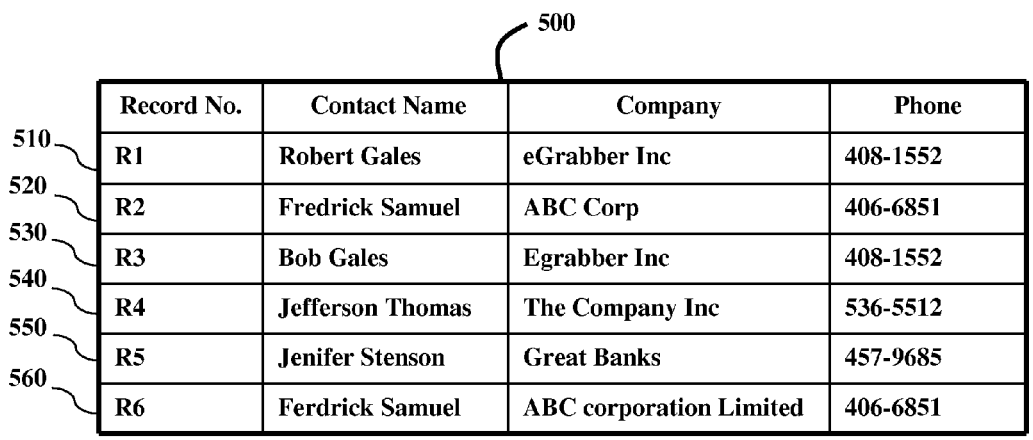
FIG. 5 shows an example table in a database.

FIG. 5 is an exemplary table 500 in a database comprising of entries corresponding to an entity wherein there exists plurality of entries for the same record which can be due to erroneous entry or difference in the filed entries including spelling, alias names or non-existence of an entry which cannot be detected by matching the field entries of a record with the corresponding field entries in another record. In the figure, records 510 and 530 are duplicate entries wherein there exists difference in the field entries which can be blocked by using a combination of plurality of matching attributes as described herein. Further in the example illustrated the records 520 and 560 are duplicate entries for the same entity.

The objective of the clustering phase is to minimize the number of comparisons and also ensuring a good accuracy percentage. Similar records using different matching attributes are grouped in the clustering phase and the grouped records are sent to the comparison phase 306.

Referring now to FIG. 5 to illustrate the importance of clustering phase. If we do a brute-force comparison to determine duplicates we would do 15 comparisons (6C2=15 combinations). Assuming that we have a clustering approach that groups records having name starting with the same letter (Attribute 1). This would result in grouping of records (R2, R6) and (R4,R5). Now with just two comparisons we would be able to find the duplicate R2 and R6. Note that we have not found all the duplicates, we have missed duplicate cluster (R1,R3) but we reduced the number of comparisons from 15 to just 2. Now adding one more clustering criteria where records having same alias names are grouped together (Attribute 2). Now with both the clustering criteria we would have clusters (R1, R3), (R2,R6) and (R4,R5). Hence there would be just 3 comparisons and all the duplicates in the database would be found.

There are various clustering techniques also known as blocking techniques for minimizing the number of comparison and ensuring good accuracy. Standard Blocking, Sorted Neighborhood, Bigram Indexing and Canopy clustering with TFIDF are some of the well-known blocking techniques. Each of these blocking techniques has their own pros and cons.

The embodiments herein teach a technique of clustering records to maximize the accuracy and to minimize the number of comparisons. In various embodiments, clustering is adapted based on the database size so that the algorithm is scalable with respect to time and space. The embodiments herein use associating keys (for example, numbers) for every attribute of the record. So, records having same attribute would be associated with the same number or key. The assigning of keys ranges from individual tokens at field level to the record level.

FIGS. 6(A-F) illustrate an exemplary non-limiting implementation of matching a plurality of attributes by considering a multitude of probabilities wherein a record is a duplicate of another record.

FIGS. 6(A-B) illustrate the results of comparing the starting alphabet of the entries for "Contact Name" field in table 500 by using comparison techniques including but not limited to brute-force comparison technique. The consecutive alphabets in the records 520, 560 and 540, 550 are compared to achieve only records 520 and 560 as duplicate records.

Figure 6A:
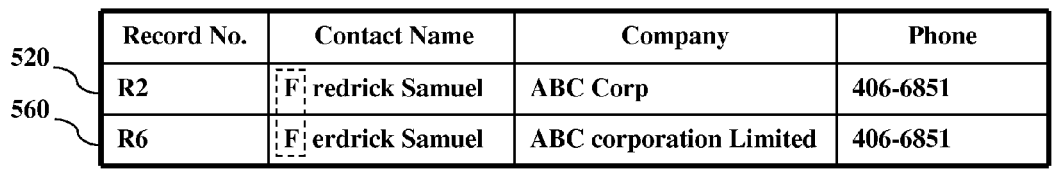
FIGS. 6(A-F) illustrate example according to an embodiment herein.
Figure 6B:
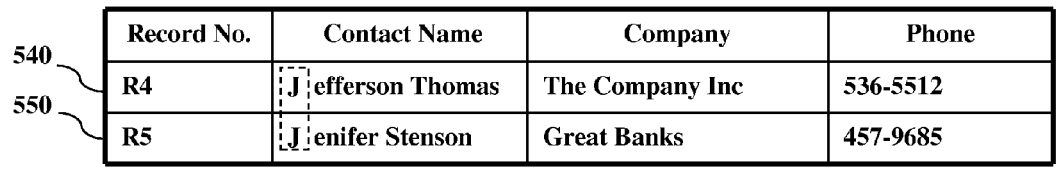
Figure 6C:
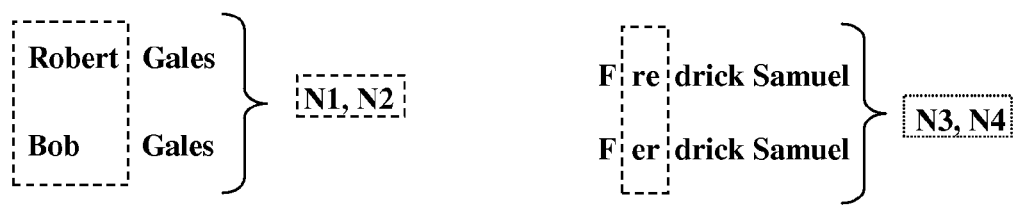

In an embodiment, the Alias MAF in the Matching Attribute Generator 235 generates the criterion wherein the complete or partial entries in the "Contact Name" field are alias of an existing field entry as represented by the assigned values N1 for tokens "Robert" (510) and its alias "Bob" in FIG. 6(C). The corresponding last name "Gales" is assigned the key N2 based on matching attribute functions.

In various embodiments, matching attribute generator 235 generates the same key wherein the tokens are spelt erroneously according to various MAF which can include Four-Gram MAF as shown in FIG. 6(C) wherein the tokens "Fredrick" and "Ferdrick" are assigned the values N3.

Figure 6D:
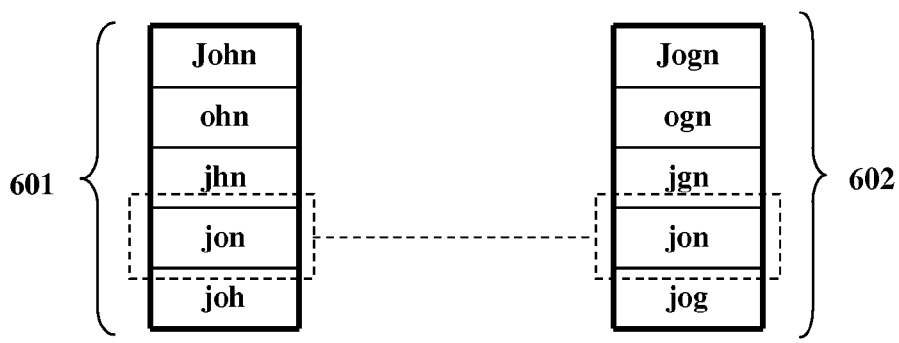

In an embodiment, the Spell MAF generates 3 gram combinations of tokens wherein tokens with one spelling error are grouped together. FIG. 6(D) illustrates an example of 3 gram MAF wherein the tokens "John" and "Jogn" and the three letter combination sets of the tokens are listed as shown by 601 and 602 respectively. The existence of a common key "jon" entitles the two sets 601 and 602 to be hashed together and assigned the same key.

The duplicate records according to the matching attributes for the field "Contact Name" is identified as records (510, 530) and (520, 560).

FIG. 6(E) illustrates the keys generated by matching attribute generator 235 according to the entries in "Company" field wherein the entries "eGrabber" and "Egrabber" are not case sensitive and are assigned the same key designated as C1.

In an embodiment normalization is achieved prior to processing the entries wherein additional non-deterministic entries of a field are not assigned any keys as illustrated in FIG. 6(E) by the assignment of C2 for "ABC Corp" and "ABC Corporation Limited".

In an embodiment the sound MAF generates same key for similar sounding tokens, for example, "Chris" and "Kris" are assigned the same key. The sound MAF includes but is not limited to Russell Soundex Algorithm, New York State Identification and Intelligence System (NYSIIS), Metaphone, Double Metaphone. Further, a plurality of MAFs can be used to increase the efficiency to find duplicate records.

In an embodiment the abbreviations are assigned the same key, for example, "New York Times", "NYT", "NY Times", "NewYork Times" are assigned the same key by the Alias MAF in the matching attribute generator 245.

In an embodiment normalization eliminates the noises including but not limited to titles in names and symbols used in some fields. Further, in the embodiment the swapped tokens are normalized and sorted to assign same keys to swapped entries wherein "Bob Gales" and "Gales Bob" are assigned the keys (N1, N2).

In an embodiment the record level keys are assigned by the matching attribute generator 245 as illustrated by FIG. 6(F) wherein the Name keys Na=(N1, N2) and Nb.(N3, N4) correspond to the name keys assigned as shown in FIG. 6(C) and the Company keys including C1 and C2 correspond to the keys assigned as shown in FIG. 6(E). The clustering Unit 240 clusters the records with same keys and sends it to the Comparing Unit 250.

Figure 7:
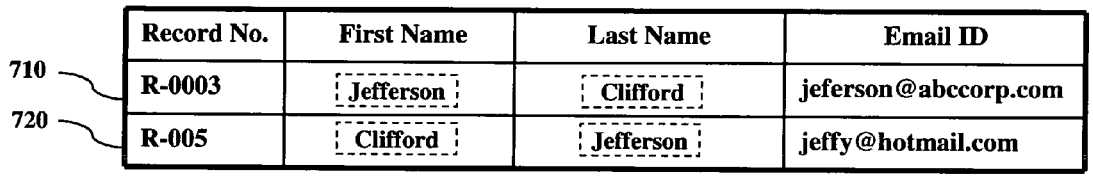
FIG. 7 illustrates an example according to an embodiment herein.

FIG. 7 illustrates an embodiment wherein data is interchanged between fields "First Name" and "Last Name" for records 710 and 720. The Clustering Unit 240 assigns the same key to both the fields designating the records as duplicates by normalizing the field keys.

Figure 8:
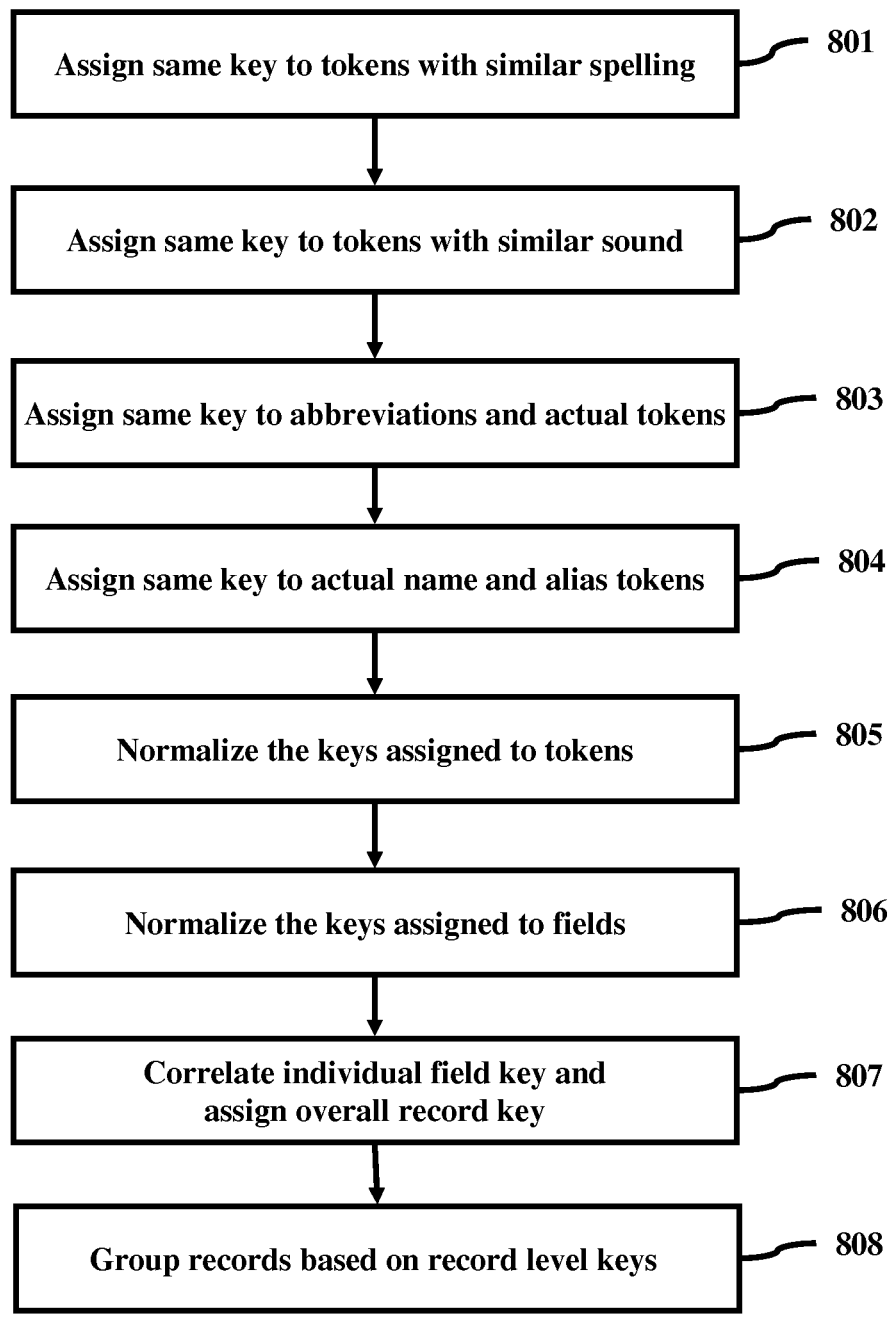
FIG. 8 is a flow diagram to illustrate implementation of some of the embodiments.

FIG. 8 is a flow diagram of a non-limiting implementation according to some of the embodiments as described herein. The Clustering Unit (240) comprising of the matching attribute generator (245) assigns keys to the tokens, fields and records according to a plurality of MAFs. The tokens with similar spellings are assigned the same key according to Spell MAF (801). Tokens with similar sounds are assigned similar keys by Sound/Phonetic MAF (802). Abbreviations and actual tokens are assigned the same keys by the Abbreviation MAF (803). Further the alias and actual names in plurality of fields are assigned the same key by the Alias MAF (804). The token keys are normalized to assign similar keys to data which are swapped in a field entry of the record (805). The data which is swapped between fields is normalized to assign the same keys to similar entries (806). The field keys are correlated and the record is assigned a key (807) and the records with same keys are grouped (808) to be compared by the Comparing Unit 250.

The Comparing Unit 250 compares the records to generate match percentage wherein the reference record is chosen from the cluster and the pair-wise percentage is computed. An adaptive process is involved to designate a record as the reference record. The reference record is selected based on criteria. One such criterion may be that the primary fields of the record should contain maximum information as compared to the other records in the cluster. Primary fields may include important fields like name or company for the example considered herein. Other criteria that may be used to select a reference record include but are not limited to record created date, and record last modified date. Upon identifying the reference record, pair wise match percentage is computed for all other records in the cluster with respect to the reference record. The percentage computation involves computation of field-wise percentage and the correlation of the percentage to form the overall record match percentage. The field level comparison is based on various criteria including but not limited to the closeness which exists in the strings, phonetics, abbreviations and alias.

An example computation of record level match percentage is provided herein. The individual field percentages are aggregated together to form the overall percentage wherein the fields include name, company, email, phone, title, address, city, state and zip. The formula to compute the overall percentage from individual field percentages is:

Record %=Record Similarity Score=$\Sigma Wt_i*Qs_i$ wherein

Record Similarity Score: Closeness of the record to the reference record.

$Wt_i$: Weight of the $i^{th}$ field (pre-configured)

$Qs_i$: Quantified score of the $i^{th}$ field for that record.

The Field Quantization Table for the fields considered in the formula is as shown by the table in FIG. 9 wherein the fields exclusive of the key fields, Name and Company are quantized to values 0, 0.25 or 1 based on the field percentage.

In some embodiments, keys may be generated without transforming data for data completion. In such cases, keys are generated by dynamic conversion of data into different formats. For example, considering the case of two records A and B where clustering is done based on city and state information. Record A comprises phone code information, and record B comprises of city and state information. In embodiments where transformation is done, the city and state information is filled in record A and then keys are generated. In embodiments where transformation is performed, phone code is directly converted to city and state information on the fly to form relevant keys without actually filling the information in city and state fields of record A. Subsequently, keys generated for record A and record B are used in clustering to cluster the records.

It will be appreciated by a skilled person in the art that the detection of the duplicates as described herein with the example is used only for illustrative purposes and shall not be construed to be limiting.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein may include a system comprising at least one processor or central processing unit (CPU). The CPUs may be interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein. The system may further include a user interface adapter that connects a keyboard, mouse, speaker, microphone, and/or other user interface devices such as a touch screen device to the bus to gather user input. Additionally, a communication adapter connects the bus to a data processing network, and a display adapter connects the bus to a display device which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A method of detecting and eliminating duplicates in a set of records containing contact information in a database of structured records, wherein each record comprises data relating to a plurality of fields, the method comprising:
normalizing field data for each record using information from a knowledge base including a pre-defined set of formats, a predefined set of mappings and a pre-defined set of rules, wherein normalizing a record comprises:
standardizing said field data in said record to represent field data in said record in a standardized format based on a combination of said formats, mappings, and rules, and
extracting data from one or more fields from the group of fields containing name, city, email address, city, and telephone number in said record based on a combination of said mappings and rules;
transforming said record to facilitate record comparison, wherein said transforming includes filling at least one empty field in said record, wherein said at least one empty field is filled with an associated data from an existing field in said each record and by using a corresponding mapping from said knowledge base;
generating one or more clusters of records based on record level keys of said records;
identifying reference record for each cluster from said one or more clusters generated;
calculating matching percentage for each said record in each said cluster, wherein matching percentage for a record in a cluster is calculated with respect to reference record of said cluster;
detecting duplicate records in each cluster based on matching percentage obtained for each record;
merging records having non-overlapping information from said detected duplicate records in each said cluster; and
purging records having identical information from said detected duplicate records in each said cluster.

2. The method as in claim 1, wherein the method further comprises transforming data by applying transformation functions, where said transformation functions generate email id using email patterns from said knowledge base and information from name field and company field.

3. The method as in claim 1, wherein said knowledge base comprises at least one of name formats, email formats, phone formats, address formats and rules for data transformation.

4. The method as in claim 1, wherein said knowledge base comprises phone code, location, and zip code mapping data.

5. The method as in claim 1, where said matching attribute function is an N gram matching attribute function.

6. The method as in claim 1, where said matching attribute function is a 4 gram matching attribute function wherein 3 gram combination of tokens are formed and common keys are established to identify spelling error.

7. The method as in claim 1, the method further comprising dynamically changing narrowness of said matching attribute function by changing underlying algorithms based on size of data, nature of the data, and the method of data entry to make the method scalable with respect to size of database.

8. The method as in claim 1, the method further comprising assigning same keys to extracted parts from one or more fields with same attributes, where an attribute is matched based on said attribute matching function.

9. The method as in claim 1, the method further comprising normalizing said data to remove noise.

10. The method as in claim 1, the method further comprising normalizing to match data even when they have tokens swapped.

11. The method as in claim 1, the method further comprising calculating record level matching percentage using field level matching percentage using the formula:

$$\text{Record Similarity Score} = \Sigma Wti * Qs\, i,$$

Wherein
Record Similarity Score is the closeness of the record to the reference record;
Wti: is the Weight of the ith field (pre-configured); and
Qsi: is the quantified score of the ith field for that record.

12. A program storage device readable by a computer, tangibly embodying a program of instructions executable by said computer to perform a method of duplicates in a set of records containing contact information, wherein each record comprises data relating to a plurality of fields, the method comprising:
normalizing field data for each record using information from a knowledge base including a pre-defined set of formats, a pre-defined set of mappings and a pre-defined rules, where normalizing a record comprises:
standardizing field data in said record to represent field data in said record in a standardized format based on a combination of said formats, mappings, and rules, and
extracting data from one or more fields from the group of fields containing name, city, email address, city, and telephone number in said record based on a combination of said mappings and rules;

transforming said record to facilitate record comparison, wherein said transforming includes filling at least one empty field in each said record, wherein said at least one empty field is filled with an associated data from an existing field in said each record and by using a corresponding mapping from said knowledge base;

generating one or more clusters of records based on record level keys of said records;

identifying reference record for each cluster from said one or more clusters;

calculating matching percentage for each record in each cluster, wherein matching percentage for a record in a cluster is calculated with respect to reference record of said cluster, detecting duplicate records in each cluster based on matching percentage obtained for each record;

merging records having non-overlapping information from said detected duplicate records in each said cluster; and purging records having identical information from said detected duplicate records in each said cluster.

13. A system for detecting duplicates in a set of contact records, wherein each record comprises data relating to a plurality of fields, the system comprising:

a first means for pre-processing data embodied in a non-transitory computer readable medium to form clusters of records, said first means comprising:

a knowledge base comprising of formats, mapping information and rules, a standardization unit to standardize data to represent information in similar formats, a field part extractor (FPE) unit to extract at least part of field;

a transformation unit to transform data, wherein said transformation unit transforms each record by filling at least one empty field in each record by applying transformation functions;

a key clustering unit, said key clustering unit further comprising a matching attribute generator, where said key clustering unit generates clusters of records based on record level key of said records;

a second means for comparing records embodied in a non-transitory computer readable medium to calculate record level matching percentage; and a third means for detecting duplicate records embodied in a non-transitory computer readable medium.

14. The system as in claim 13, wherein said knowledge base comprises of name formats, email formats, phone formats and, address formats.

15. The system as in claim 13, wherein said knowledge base comprises email formats and email id formation rules based on name and company field information.

16. The system as in claim 13, wherein said knowledge base comprises rules for data transformation.

17. The system as in claim 13, wherein said knowledge base comprises phone code, city, state, and zip code mapping data.

18. The system as in claim 13, wherein said knowledge base comprises rules to identify company name from website field information.

* * * * *